(12) United States Patent
Kosonocky

(10) Patent No.: US 7,085,796 B1
(45) Date of Patent: Aug. 1, 2006

(54) DYNAMIC ADDER WITH REDUCED LOGIC

(75) Inventor: Stephen V. Kosonocky, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 09/589,716

(22) Filed: Jun. 8, 2000

(51) Int. Cl.
*G06F 7/50* (2006.01)

(52) U.S. Cl. ...................................... 708/700
(58) Field of Classification Search .............. 708/670, 708/711, 701, 700, 671, 710, 703; 703/21
See application file for complete search history.

(56) References Cited

U.S. PATENT DOCUMENTS

| | | | | |
|---|---|---|---|---|
| 3,646,332 A | * | 2/1972 | Suzuki | 708/703 |
| 4,718,034 A | * | 1/1988 | Takla et al. | 708/703 |
| 5,257,218 A | * | 10/1993 | Poon | 708/712 |
| 5,278,783 A | * | 1/1994 | Edmondson | 708/711 |
| 5,717,622 A | * | 2/1998 | Kawamoto et al. | 708/701 |
| 5,793,662 A | * | 8/1998 | Duncan et al. | 708/670 |
| 5,898,596 A | * | 4/1999 | Ruetz | 703/21 |
| 5,905,667 A | * | 5/1999 | Lee | 708/700 |
| 5,933,362 A | * | 8/1999 | Inoue | 708/711 |
| 5,943,251 A | * | 8/1999 | Jiang et al. | 708/710 |
| 6,269,386 B1 | * | 7/2001 | Siers et al. | 708/710 |
| 6,470,373 B1 | * | 10/2002 | Moller | 708/671 |

OTHER PUBLICATIONS

R.P. Brent et al., "A Regular Layout for Parallel Adders," IEEE Transactions on Computers, vol. C-31, No. 3, p. 1-9, Mar. 1982.

* cited by examiner

*Primary Examiner*—Kakali Chaki
*Assistant Examiner*—Chat C. Do
(74) *Attorney, Agent, or Firm*—Ryan, Mason & Lewis, LLP

(57) ABSTRACT

A dynamic parallel adder is provided which eliminates the positive (or negative) complimentary carry generate and propagate signal logic normally used to implement a conventional dynamic parallel added. The method for implementing the incentive adder users a novel XOR configuration constructed with dynamic CMOS logic circuits.

6 Claims, 3 Drawing Sheets

DYNAMIC ADDER WITH REDUCED LOGIC

FIELD OF THE INVENTION

The present invention relates generally to logical adders and, more particularly, to a dynamic parallel adder which eliminates positive or negative complementary carry generate and propagate signal logic normally used to implement a conventional dynamic parallel adder.

BACKGROUND OF THE INVENTION

A 64 bit adder function is typically the most basic frequency limiting function in a 64 bit microprocessor. Propagating information from a carry input to the most significant bit of the adder's operand is typically the longest logical delay path in the adder. Carry look-ahead schemes have been developed to reduce the total number of logic stages in this path at the expense of added logic.

Dynamic circuit realizations have also been shown to decrease the logic delay through the adder by reducing the total gate capacitance in each logic gate by the use of precharge signals and elimination of complementary logic transistors, but at the expense of an increase in the amount of logic gates, requiring both positive true and positive complement carry signals to be generated before computation of the final sum. Greater use of digital logic for accomplishing a specific function increases the circuit area resulting in increased cost and power usage.

As is known, "positive true" logic is defined as logic which outputs a signal which is electrically at a high voltage level (e.g., $V_{DD}$) when the function being evaluated by the logic is evaluated as "true" (e.g., a logical '1' state). On the other hand, "positive complement" logic is defined as logic which outputs a signal which is electrically at a high voltage level (e.g., $V_{DD}$) when the function being evaluated by the logic is evaluated as "complement" (e.g., a logical '0' state). Of course, dynamic logic may be implemented in terms of "negative true" and "negative complement" logic. As is known, "negative true" logic is defined as logic which outputs a signal which is electrically at a low voltage level (e.g., $V_{SS}$) when the function being evaluated by the logic is evaluated as "true" (e.g., a logical '1' state). On the other hand, "negative complement" logic is defined as logic which outputs a signal which is electrically at a low voltage level (e.g., $V_{SS}$) when the function being evaluated by the logic is evaluated as "complement" (e.g., a logical '0' state). While positive or negative dynamic logic may be employed in an adder function, the descriptions herein refer to positive dynamic logic.

Thus, typical dynamic adder configurations are implemented with positive true block generate and block propagate signals, and also positive complementary versions of block generate and block propagate, to allow creating a final sum using an XOR (exclusive OR) logic circuit which is typically implemented as:

$$S(n) = (\hat{\ }p(n)*C(n-1) + (p(n)*\hat{\ }C(n-1)) \qquad (1)$$

$$p(n) = a(n) + b(n), \qquad (2)$$

where C(n−1) is the generate signal from bit (n−1), p(n) is the propagate signal from bit n and a(n), b(n) are two operand bits, ^ is the COMPLEMENT operator, * is the AND operator, + is the OR operator. It is to be understood that the COMPLEMENT operator ^ refers to the normal logical operation of complementing a signal, as opposed to the term "positive complementary" used with respect to dynamic circuit technology. In any case, it is known that the above representation of the final sum in equation (1) requires both a positive true and positive complementary version of C(n−1), where the positive complementary version of C(n−1) is constructed from positive complementary block generate and block propagate logic, to allow a dynamic implementation of this logic function. This stems from the requirement that dynamic logic gates require all inputs to either remain at a logic "0" state or transition only once to a logical "1" state, within a single clock cycle.

SUMMARY OF THE INVENTION

The present invention provides an improved implementation of a binary dynamic adder. Specifically, in one aspect of the invention, a binary dynamic adder uses the following boolean expression for implementing the final sum:

$$S(n) = \hat{\ }(p(n)*C(n-1))*(p(n)+C(n-1)). \qquad (3)$$

The terms for evaluating the final sum bit are constructed from only positive (or negative) true block generate and block propagate signals, eliminating roughly half the carry logic associated with positive (or negative) complementary signal generation of the typical configuration. Expressing the final sum bit in the above form allows a simple implementation using a reduced number of dynamic logic gates, as will be explained in detail below and illustrated in accordance with the figures.

In another aspect of the invention, an N-bit parallel adder comprises: (i) a first logic stage, the first logic stage configured to receive a first N-bit binary value and a second N-bit binary value and compute generate signals and propagate signals for each bit; (ii) a second logic stage, coupled to the first logic stage, the second logic stage configured to compute block generate signals and block propagate signals for groups of one through m bits from the generate and propagate signals computed in the first logic stage; (iii) a third logic stage, coupled to the second logic stage, the third logic stage configured to combine the block generate and block propagate signals of one set of groups with the block generate and block propagate signals of another set of groups; and (iv) a fourth logic stage, coupled to the third logic stage, the fourth logic stage configured to combine remaining uncombined block generate and block propagate signals with a propagate signal associated with each bit, and to generate a summation signal wherein the summation signal represents the logical addition of the first and second binary values and the summation signal is generated without the need for positive (or negative) complementary signal generation.

By eliminating the need for positive (or negative) complementary signal generation in the parallel adder, the invention provides many benefits. For example, the invention realizes the benefits of reduced power consumption and reduced circuit area due to the elimination of positive (or negative) complementary carry logic.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
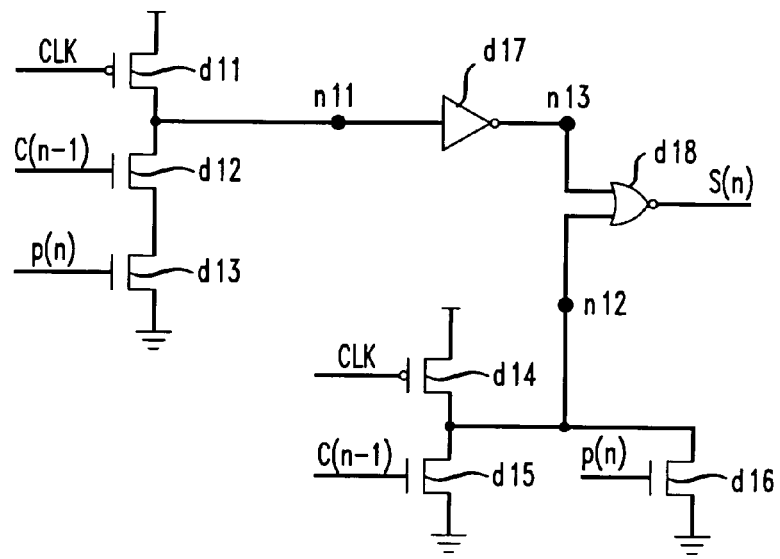
FIG. 1 is a schematic drawing of an XOR function according to an embodiment of the present invention con

In the following detailed description, certain specific terminology will be employed for the sake of clarity and a particular embodiment, but it is to be understood that the specific terminology is not intended to be limiting and should not be so construed inasmuch as the invention is capable of taking many forms and variations within the scope of the claims.

Further, while the following detailed description of illustrative embodiments of the invention refers to positive dynamic logic (requiring only positive true signal generation), one of ordinary skill in the art will realize that the principles of the invention may be applied to negative dynamic logic (requiring only negative true signal generation) in a straightforward manner.

The logical architecture of a preferred adder is based on the associative operator described in R. Brent and H. T. Kung, "A Regular Layout for Parallel Adders," IEEE Transactions on Computers, Vol. C-31, No. 3, Mar. 1982, pp. 260–264, the disclosure of which is incorporated by reference herein, which allows reorganization of carry generate and propagate signals to reduce the maximum number of logical delay stages to propagate the carry signal. The sum bit for binary addition is given as:

$$s_i = \alpha_i \oplus b_i \oplus c_{i-1} \quad i = 1 \rightarrow n, \tag{4}$$

where $\alpha$ represents a first binary value and b represents a second binary value, i represents the bit number and $\oplus$ represents the summing operator. The carry signal, $c_{i-1}$, can be described in terms of generate and propagate signals as:

$$c_i = g_i + (p_i c_{i-1}), \tag{5}$$

where $$g_i = \alpha_i b_i \tag{6}$$

and $$p_i = \alpha_i \oplus b_i. \tag{7}$$

As described by Brent and Kung, an associative operator o can be defined that takes the form of:

$$(g, p) o (g', p') = g + (pg'), pp') \tag{8}$$

where $$(G_i, P_i) = \begin{cases} (g_1, p_1) & \text{if } (i = 1) \\ (g_i, p_i) o (G_{i-1}, P_{i-1}) & \text{if } (2 \leq i \leq n) \end{cases} \tag{9}$$

Expansion of equation (9) and rearranging terms in a convenient manner, based on the associative property of the new operator, it is possible to construct an adder using O(log n) stages, where each stage takes the form of equation (8).

Greater reduction of logical delay stages can be obtained by combining multiple generate and propagate terms in a single complex logic stage. High frequency operation is possible if the generate-propagate stages are implemented with dynamic logic, exploiting the wide "or" structures available in this logic family, grouping together terms from multiple bits into group terms. As an example of grouping generate-propagate stages and minimizing the logic for implementation using dynamic circuits, expansion of equation (9) for n=6 and combining terms gives:

$$grpG_6 = G_6 + P_6 G_5 + P_6 G_5 G_4 + P_6 P_5 P_4 G_3 + P_6 P_5 P_4 G_2 + P_6 P_5 P_4 P_3 P_2 G_1 \tag{10}$$

and $$grpP_6 = P_6 P_5 P_4 P_3 P_2 P_1, \tag{11}$$

where $grpG_6$ and $grpP_6$ are group generate and group propagate signals, respectively.

The high order product terms can be reduced using the relations:

$$Z = A + B + C + (DE) + (DF) + (DG), \tag{12}$$

$$Z = (A + B + C) + D(E + F + G) \tag{13}$$

$$Z = (A + B + C + D)(A + B + C + E + F + G), \tag{14}$$

using the boolean property that:

$$X + YZ = (X + Y)(X + Z). \tag{15}$$

Using the relations given by equation (12) through equation (15), equation (10) can be rewritten as:

$$grpG_6 = (G_6 + P_6 G_5 + P_6 P_5 G_4 + P_6 P_5 P_4) \\ (G_6 + P_6 G_5 + P_6 P_5 G_4 + G_3 + P_3 G_2 + P_3 P_2 G_1) \tag{16}$$

Figure 2:
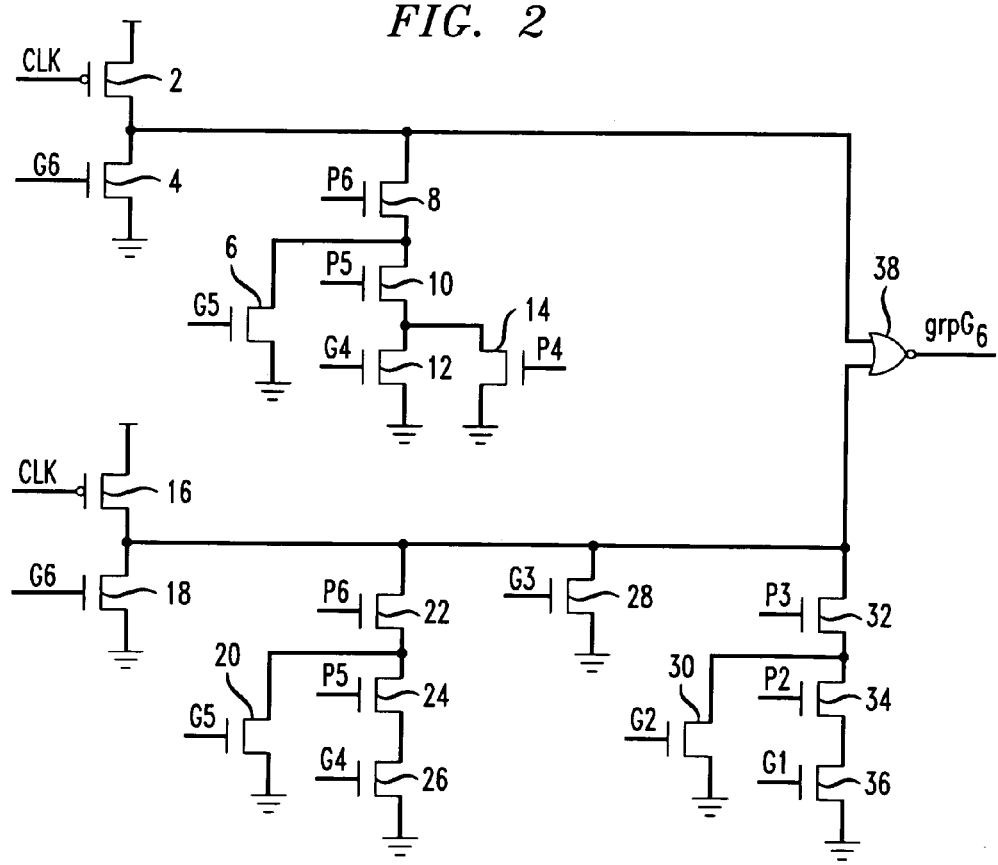
- FIG. 2 is a schematic drawing of a dynamic logic gate according to an embodiment of the present invention used for grouping six carry signals to form a group six carry generate signal.

The logical form of equation (16) is convenient for dynamic circuit implementation because it can be constructed with two complex "AND-OR" terms combined with a static NOR gate, where the partial product terms are no greater then three, which means the highest NMOS (negative MOS) transistor stack is three. A circuit realization of equation (16) is shown in FIG. 2. The first complex "AND-OR" term is represented by the logic configuration including transistors 4 through 14. Transistor 2 gates the clock signal. The second complex "AND-OR" term is represented by the logic configuration including transistors 18 through 36. Transistor 16 gates the clock signal. The two complex "AND-OR" terms are combined via the NOR gate 38 to yield $grpG_6$.

Figure 3:
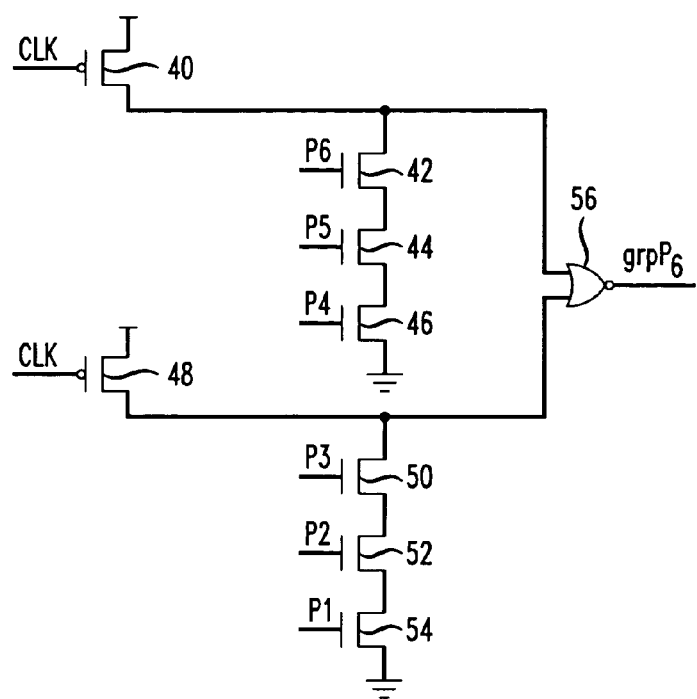
FIG. 3 is a schematic drawing of a dynamic logic gate according to an embodiment of the present invention used for grouping six carry propagate signals to form a group six carry propagate signal.

Likewise, the large AND structure for equation (11) can be constructed with two "AND-OR" dynamic terms combined with a static NOR gate to create the wide "AND" function. A circuit realization of equation (11) using the described technique is shown in FIG. 3. The first "AND-OR" term is represented by the logic configuration including transistors 42 through 46. Transistor 40 gates the clock signal. The second "AND-OR" term is represented by the logic configuration including transistors 50 through 54. Transistor 48 gates the clock signal. The two "AND-OR" terms are combined via the NOR gate 56 to yield grpP$_6$. Similar reductions can be made for lower order generate-propagate terms which lead to:

$$grpG_5 = (G_5 + P_5G_4 + P_5P_4G_3 + P_5P_4P_3) \quad (17)$$
$$(G_5 + P_5G_4 + P_5P_4G_3 + P_3G_2 + P_3P_2G_1)$$

$$grpP_5 = P_5P_4P_3P_2P_1, \quad (18)$$

$$grpG_4 = (G_4 + P_4G_3 + P_4P_3)(G_4 + P_4G_3 + G_2 + P_2G_1), \quad (19)$$

$$grpP_4 = P_4P_3P_2P_1, \quad (20)$$

$$grpG_3 = G_3 + P_3G_2 + P_3P_2G_1, \quad (21)$$

$$grpP_3 = P_3P_2P_1, \quad (22)$$

$$grpG_2 = G_2 + P_2G_1, \quad (23)$$

$$grpP_2 = P_2P_1, \quad (24)$$

$$grpG_1 = G_1, \quad (25)$$

$$grpP_1 = P_1. \quad (26)$$

Dynamic circuit implementations of lower order group generate and group propagate terms given by equation (17) through equation (26) can be realized in a similar manner to that given for the highest level term given by equation (16) and implemented with the circuit in FIG. 2 and FIG. 3 with a reduction of inputs.

Calculation of the final sums is given by equation (4), where $c_{i-1} = g_{i-1}$. When used for merging nodes on the first level of the adder, the uppercase G, P's are replaced by the lower case values (g, p) obtained from the initial generate-propagate stage described by equation (6) and equation (7). Choice of the degree of generate-propagate merging, determines the maximum number of complex logic levels needed to fully propagate the generate-propagate terms. The degree of merging is balanced with the maximum fan-in and fan-out per adder node. This needs to be balanced with the CMOS (complementary metal oxide semiconductor) circuit technology available, trading off logic levels as a function of wire loading and power.

A high degree of merging (i.e., six), performed in the first two stages of the adder leaves the last stage with relatively smaller requirements on fan-in. This reduced requirement on the final generate-propagate stage allows combining this stage with the sum stage given by equation (4). A simple sum term, where the previous generate signal describes the complete carry term to that point can be given as:

$$s_i = G_{i-1} \oplus p_i. \quad (27)$$

Implementation of the "XOR" function with dynamic logic can be accomplished using the following boolean expansion:

$$A \oplus B = (\overline{AB})(A+B). \quad (28)$$

Equation (28) can be implemented using a complex dynamic gate as shown in FIG. 1.

The operation of the logic gate described by equation (3) and shown in FIG. 1 works in the following manner. Initially, a low asserted reset signal applied to the clk pin activates transistor d11 and d14 which forces the voltages at nodes n11 and n12 to the high level and resets the output S(n) to a low level, while inputs C(n-1) and p(n) are reset to a low state cutting off transistors d12, d13, d15 and d16. At a later time, the reset signal attached to the clk pins is deasserted to a high level, cutting off the reset transistors d11 and d14, placing the nodes n11 and n12 into a high impedance dynamic state charged to a high voltage level. If input pins C(n-1) and p(n) are simultaneously asserted high, the output S(n) remains in a low logic level. If C(n-1) and p(n) remain at a low logic level, the output remains at a low logic level. If only one input C(n-1) or p(n) transition to a high logic level, the output will transition to a high logic level.

A sum node merging three prior group generate signals can be written as:

$$s_i = [G_{i-1} + P_{i-1}G_{i-2} + P_{i-1}P_{i-2}G_{i-3}] \oplus p_i. \quad (29)$$

The "XOR" can be expressed in the form given in equation (28) to produce:

$$s_i = [\overline{p_iG_{i-1} + p_iP_{i-1}G_{i-2} + p_iP_{i-1}P_{i-2}G_{i-3}}][G_{i-1} + P_{i-1}G_{i-2} + P_{i-1}P_{i-2}G_{i-3} + p_i] \quad (30)$$

Figure 4:
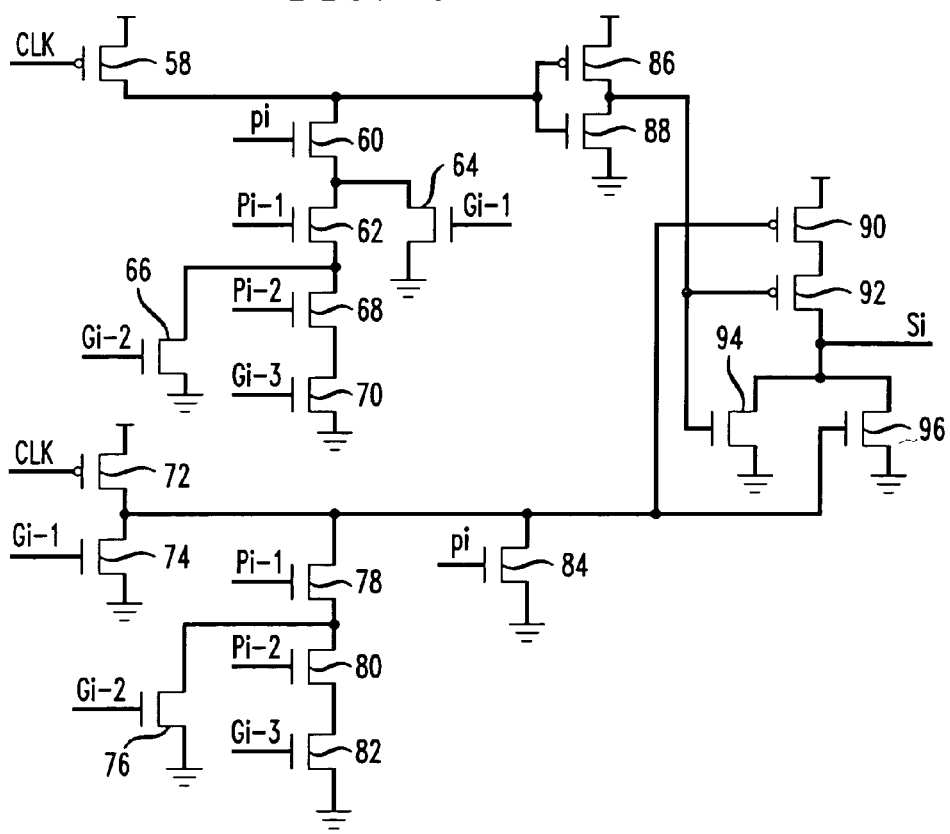
FIG. 4 is schematic drawing of a dynamic logic gate according to an embodiment of the present invention used to perform a sum calculation using a combination of group generate and propagate signals.

Inspection of equation (30) shows that the third sum term contains four product terms, this requires a stack of four NMOS transistors to implement with dynamic logic and is shown in FIG. 4. The first "AND-OR" term is represented by the logic configuration including transistors 60 through 70. Transistor 58 gates the clock signal. The second "AND-OR" term is represented by the logic configuration including transistors 74 through 84. Transistor 72 gates the clock signal. Transistors 86 and 88 provide the complementing of the first term. The two "AND-OR" terms are combined via transistors 90 through 96 to yield $s_i$. Similar expressions can be constructed for simpler sum terms that require less combinations of previous generate-propagate terms.

Figure 5:
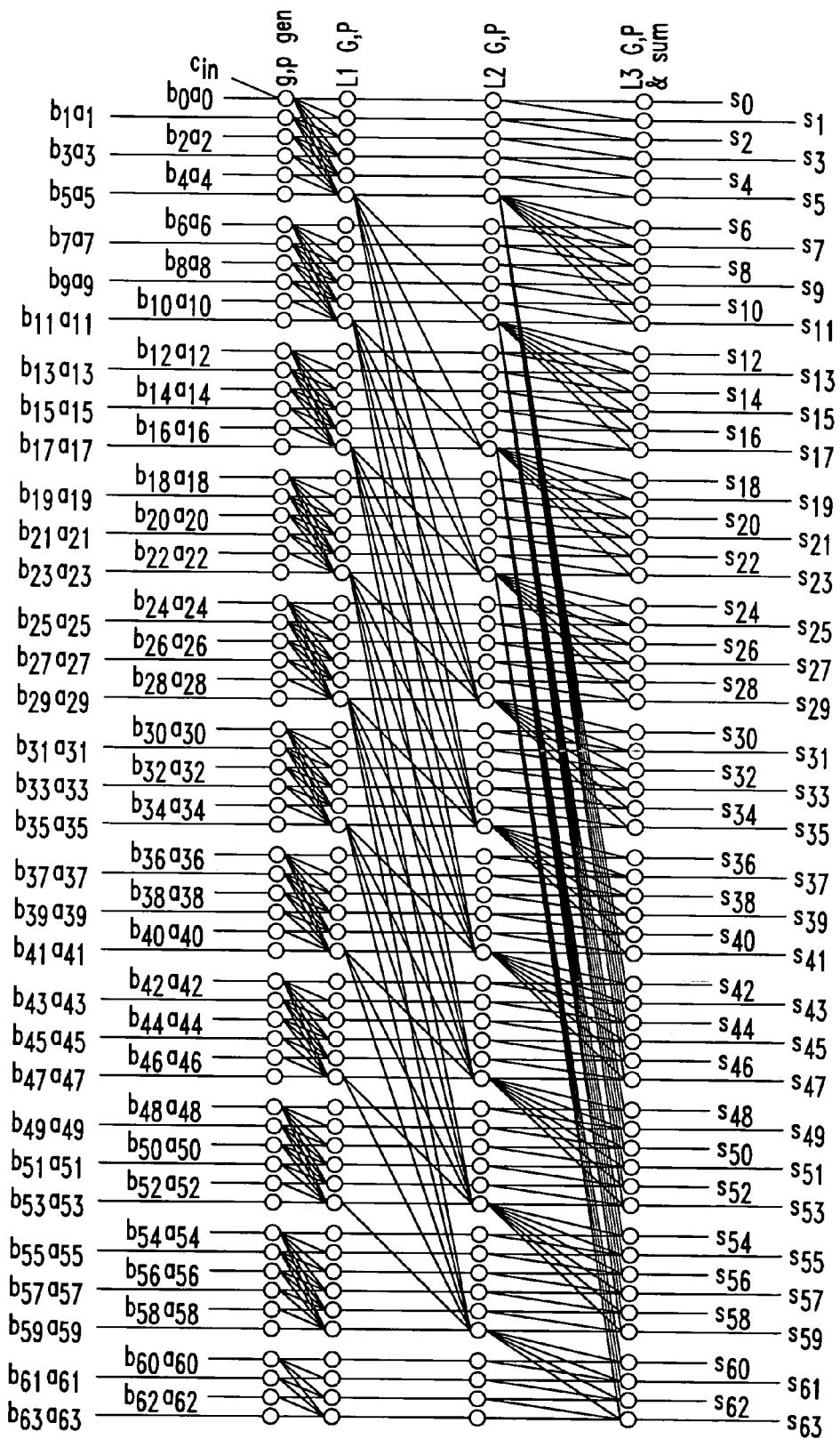
FIG. 5 is a block diagram of a 64 bit parallel adder according to an embodiment of the present invention showing the connections between logical gates to transmit and forward carry terms which allow complete sum calculation in a minimum of logical calculations.

A top level diagram of the 64 bit adder with a maximum fan-in of six, using the above logical expressions for each node is illustrated in FIG. 5. FIG. 5 shows the diagram of a 64 bit add function completed in four levels of complex logic stages. The first complex logical stage of the adder, labeled "g,p gen" in FIG. 5, computes the standard generate and propagate signals for each bit following equation (6) and equation (7). The next level, labeled "L1 G,P", computes the block generate and propagate signals for groups of one through six bits, as illustrated in FIG. 5. The fan-in to each node is limited to six for every sixth bit. Each node implements the functions described by equation (10), equation (11) or equation (17) through equation (26), depending on the fan-in requirements. The third level of the adder, labeled "L2 G,P" in FIG. 5, combines the block generate and propagate of the lower groups of six, with those higher groups of six bit blocks as shown in FIG. 5, using the same logical equations equation (10), equation (11) or equation (17) through equation (26). Nodes with a single input, pass through the generate and propagate signals with delay elements. The final and fourth complex logical stage, labeled "L3 G,P & sum" in FIG. 5, combines the remaining uncombined block generate and propagate signals (i.e., block generate and propagate signals which have not been combined in the previous stages) with each propagate bit given by equation (7), and generates the sum calculation using the boolean expression given by equation (30), dropping input terms when they are not applicable.

Accordingly, as has been explained above, the present invention provides a dynamic parallel adder which eliminates the positive (or negative) complimentary carry generate and propagate signal logic normally used to implement a conventional dynamic parallel adder. The method for implementing the inventive adder uses a novel XOR configuration constructed with dynamic CMOS logic circuits. It is to be appreciated that the implementation of the 64 bit adder shown in FIGS. 1 through 5 and described by equation (16) through equation (30) is but one example of a 64 bit parallel dynamic adder circuit according to the invention, and those skilled in the art will recognize that this example is scaleable to higher and lower bit widths and different circuit styles. For example, the dynamic adder of the present invention may be implemented by discrete logic components, as part of an integrated circuit, or some combination thereof. The dynamic adder of the present invention may also be integrated as part of a microprocessor or some other processing device.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Apparatus for use in summing at least two binary values, comprising:

a binary adder circuit responsive to a first binary value, a second binary value and a carry value, and operative to generate a binary output signal S(n) representative of a summation of the first binary value, the second binary value and the carry value, the binary adder circuit having dynamic logic, without inversion of signals driving one or more dynamic nodes associated with the dynamic logic, for implementing an exclusive OR function that generates the binary output value without one of a positive and a negative complementary version of the carry value;

wherein the binary output signal S(n) is implemented in accordance with an expression: $\hat{}(p(n)*C(n-1))*(p(n)+C(n-1))$, where C(n−1) is a generate signal from a binary value n−1 associated with the carry value, p(n) is a propagate signal associated with the first binary value and the second binary value, $\hat{}$ is a logical complement operator, * is an AND operator, and + is an OR operator.

2. The apparatus of claim 1, wherein the logic of the binary adder circuit comprises:

a first NMOS transistor stage for performing an AND operation on the generate signal and the propagate signal;

an inverter stage, coupled to the first NMOS transistor stage, for inverting an output signal generated by the first NMOS transistor stage;

a second NMOS transistor stage for performing an OR operation on the generate signal and the propagate signal; and a NOR gate, coupled to the inverter stage and the second NMOS transistor stage, for combining an output signal generated by the inverter stage and an output signal generated by the second NMOS transistor stage to generate the binary output value.

3. The apparatus of claim 2, wherein the first NMOS transistor stage is responsive to more than one generate signal and more than one propagate signal.

4. The apparatus of claim 3, wherein the second NMOS transistor stage is responsive to more than one generate signal and more than one propagate signal.

5. A dynamic N-bit parallel adder, comprising:

a first logic stage, the first logic stage configured to receive a first N-bit binary value and a second N-bit binary value and compute generate signals and propagate signals for each bit;

a second logic stage, coupled to the first logic stage, the second logic stage configured to compute block generate signals and block propagate signals for groups of one through m bits from the generate and propagate signals computed in the first logic stage;

a third logic stage, coupled to the second logic stage, the third logic stage configured to combine the block generate and block propagate signals of one set of groups with the block generate and block propagate signals of another set of groups; and a fourth logic stage, coupled to the third logic stage, the fourth logic stage configured to combine remaining uncombined block generate and block propagate signals with a propagate signal associated with each bit, and to generate a summation signal wherein the summation signal represents the logical addition of the first and second binary values and the summation signal is generated without a need for one of positive and negative complementary signal generation;

wherein at least one of the logic stages has dynamic logic, without inversion of signals driving one or more dynamic nodes associated with the dynamic logic; and wherein the fourth logic stage implements an exclusive OR function to generate the summation signal and bit i of the summation signal is: $[p_i G_{i-1} + p_i P_{i-1} G_{i-2} + p_i P_{i-1} P_{i-2} G_{i-3}][G_{i-1} + P_{i-1} G_{i-2} + P_{i-1} P_{i-2} G_{i-3} + p_i]$, where p is a propagate signal and g is a generate signal and P is a group propagate signal and G is a group generate signal.

6. A method of adding, in parallel, a first N-bit binary value and a second N-bit binary value, the method comprising the steps of:

computing generate signals and propagate signals for each bit;

computing block generate signals and block propagate signals for groups of one through m bits from the generate and propagate signals computed in the first computing step;

combining the block generate and block propagate signals of one set of groups with the block generate and block propagate signals of another set of groups; and combining remaining uncombined block generate and block propagate signals with a propagate signal associated with each bit, and generating a summation signal wherein the summation signal represents the dynamic logical addition of the first and second binary values and the summation signal is generated without a need for one of positive and negative complementary signal generation;

wherein the dynamic logical addition is performed without inversion of the generate signals, propagate signals, block generate signals and block propagate signals; and wherein the summation signal is generated in accordance with an exclusive OR function and bit i of the summation signal is $[p_i G_{i-1} + p_i P_{i-1} G_{i-2} + p_i P_{i-1} P_{i-2} G_{i-3}] [G_{i-1} + P_{i-1} G_{i-2} + P_{i-1} G_{i-2} + P_{i-1} P_{i-2} G_{-3} + p_i]$, where is a propagate signal and g is a generate signal aid P is a group propagate signal and G is a group generate signal.

* * * * *

UNITED STATES PATENT AND TRADEMARK OFFICE
CERTIFICATE OF CORRECTION

PATENT NO. : 7,085,796 B1
APPLICATION NO. : 09/589716
DATED : August 1, 2006
INVENTOR(S) : Stephen V. Kosonocky It is certified that error appears in the above-identified patent and that said Letters Patent is hereby corrected as shown below:

In the specification:

Col. 3, line 50 delete " $s_i=a_i \oplus b_i \oplus c_{i-1} i=1 \rightarrow n$ "

and insert -- $s_i=a_i \oplus b_i \oplus c_{i-1}$    $i=1 \rightarrow n$ --

Col. 4, line 23 delete "$grpG_6 - G_6 + P_6G_5 + P_6G_5G_4 + P_6P_5P_4G_3 + P_6P_5P_4G_2 + P_6P_5P_4P_3P_2G_1$" and insert --$grpG_6 = G_6 + P_6G_5 + P_6P_5G_4 + P_6P_5P_4G_3 + P_6P_5P_4P_3G_2 + P_6P_5P_4P_3P_2G_1$ --

Col. 6, line 25, delete " $s_i=[\overline{p_iG_{i-1}+p_iP_{i-1}G_{i-2}+p_iP_{i-1}P_{i-2}G_{i-3}}][G_{i-1}+P_{i-1}G_{i-2}+P_{i-1}P_{i-2}G_{i-3}+p_i])$ "

and insert

-- $s_i = p_iG_{i-1} + p_iP_{i-1}G_{i-2} + p_iP_{i-1}P_{i-2}G_{i-3} [G_{i-1} + P_{i-1}G_{i-2} + P_{i-1}P_{i-2}G_{i-3} + p_i]$    (30) --

In the title page (57) abstract:

Line 4 of the abstract, delete "added" and insert --adder--.

Line 5 of the abstract, delete "incentive" and insert --inventive--.

Line 5 of the abstract, delete "users" and insert --uses--.

UNITED STATES PATENT AND TRADEMARK OFFICE
CERTIFICATE OF CORRECTION

PATENT NO. : 7,085,796 B1
APPLICATION NO. : 09/589716
DATED : August 1, 2006
INVENTOR(S) : Stephen V. Kosonocky It is certified that error appears in the above-identified patent and that said Letters Patent is hereby corrected as shown below:

In the claims:

Claim 6, col. 8, line 63, insert --p-- after the word "where".

Claim 6, col. 8, line 64, delete "aid" and insert --and--.

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,085,796 B1
APPLICATION NO. : 09/589716
DATED : August 1, 2006
INVENTOR(S) : Stephen V. Kosonocky It is certified that error appears in the above-identified patent and that said Letters Patent is hereby corrected as shown below:

In the specification:

Col. 3, line 50 delete " $s_i = a_i \oplus b_i \oplus c_{i-1} i=1 \rightarrow n$ "

and insert -- $s_i = a_i \oplus b_i \oplus c_{i-1} \quad i=1 \rightarrow n$ --

Col. 4, line 23 delete "$grpG_6 - G_6 + P_6G_5 + P_6G_5G_4 + P_6P_5P_4G_3 + P_6P_5P_4G_2 + P_6P_5P_4P_3P_2G_1$" and insert --$grpG_6 = G_6 + P_6G_5 + P_6P_5G_4 + P_6P_5P_4G_3 + P_6P_5P_4P_3G_2 + P_6P_5P_4P_3P_2G_1$ --

Col. 6, line 25, the equation should appear as follows;

-- $s_i = p_iG_{i-1} + p_iP_{i-1}G_{i-2} + p_iP_{i-1}P_{i-2}G_{i-3} [G_{i-1} + P_{i-1}G_{i-2} + P_{i-1}P_{i-2}G_{i-3} + p_i]$ (30) --

In the title page (57) abstract:

Line 4 of the abstract, delete "added" and insert --adder--.

Line 5 of the abstract, delete "incentive" and insert --inventive--.

Line 5 of the abstract, delete "users" and insert --uses--.

UNITED STATES PATENT AND TRADEMARK OFFICE
CERTIFICATE OF CORRECTION

PATENT NO. : 7,085,796 B1
APPLICATION NO. : 09/589716
DATED : August 1, 2006
INVENTOR(S) : Stephen V. Kosonocky It is certified that error appears in the above-identified patent and that said Letters Patent is hereby corrected as shown below:

In the claims:

Claim 6, col. 8, line 63, insert --p-- after the word "where".

Claim 6, col. 8, line 64, delete "aid" and insert --and--.

This certificate supersedes the Certificate of Correction issued December 12, 2006.

Signed and Sealed this

Eighth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,085,796 B1
APPLICATION NO. : 09/589716
DATED : August 1, 2006
INVENTOR(S) : Stephen V. Kosonocky It is certified that error appears in the above-identified patent and that said Letters Patent is hereby corrected as shown below:

In the specification:

Col. 3, line 50 delete " $s_i = a_i \oplus b_i \oplus c_{i-1} i=1 \rightarrow n$ "

and insert -- $s_i = a_i \oplus b_i \oplus c_{i-1}$   $i=1 \rightarrow n$ --

Col. 4, line 23 delete "$grpG_6 - G_6 + P_6G_5 + P_6G_5G_4 + P_6P_5P_4G_3 + P_6P_5P_4G_2 + P_6P_5P_4P_3P_2G_1$" and insert --$grpG_6 = G_6 + P_6G_5 + P_6P_5G_4 + P_6P_5P_4G_3 + P_6P_5P_4P_3G_2 + P_6P_5P_4P_3P_2G_1$ --

Col. 6, line 25, the equation should appear as follows;

-- $s_i = \overline{[p_i G_{i-1} + p_i P_{i-1} G_{i-2} + p_i P_{i-1} P_{i-2} G_{i-3}]} \, [G_{i-1} + P_{i-1} G_{i-2} + P_{i-1} P_{i-2} G_{i-3} + p_i]$   (30) --

In the title page (57) abstract:

Line 4 of the abstract, delete "added" and insert --adder--.

Line 5 of the abstract, delete "incentive" and insert --inventive--.

Line 5 of the abstract, delete "users" and insert --uses--.

UNITED STATES PATENT AND TRADEMARK OFFICE
CERTIFICATE OF CORRECTION

PATENT NO. : 7,085,796 B1
APPLICATION NO. : 09/589716
DATED : August 1, 2006
INVENTOR(S) : Stephen V. Kosonocky It is certified that error appears in the above-identified patent and that said Letters Patent is hereby corrected as shown below:

In the claims:

Claim 6, col. 8, line 63, insert --p-- after the word "where".

Claim 6, col. 8, line 64, delete "aid" and insert --and--.

This certificate supersedes the Certificate of Correction issued December 12, 2006 and April 8, 2008.

Signed and Sealed this

Twelfth Day of August, 2008

JON W. DUDAS
*Director of the United States Patent and Trademark Office*